United States Patent [19]

Friend et al.

[11] Patent Number: 4,642,236
[45] Date of Patent: Feb. 10, 1987

[54] PROCESS FOR REDUCING THE LEVEL OF OBJECTIONABLE FLAVORS IN VEGETABLE PROTEIN BY MICROORGANISM CONTACT

[75] Inventors: Beverly A. Friend, Collinsville, Ill.; Dennis L. Gierhart, High Ridge; Judy K. O'Brien, St. Louis, both of Mo.

[73] Assignee: Ralston Purina Company, St. Louis, Mo.

[21] Appl. No.: 720,110

[22] Filed: Apr. 4, 1985

[51] Int. Cl.4 .................. A23J 3/00; A23L 1/015; A23L 1/211
[52] U.S. Cl. ........................ 426/44; 426/46; 426/52; 426/656; 426/486
[58] Field of Search ............ 426/44, 46, 52, 656, 426/486

[56] References Cited

U.S. PATENT DOCUMENTS 3,917,851 11/1975 Arnaud et al. ............... 426/46

FOREIGN PATENT DOCUMENTS 48-14060 5/1973 Japan ............... 426/46
51-51592 5/1976 Japan ............... 426/46

Primary Examiner—Robert Yoncoskie
Attorney, Agent, or Firm—Virgil B. Hill

[57] ABSTRACT

A process for the reduction of undesirable flavor components contained in a vegetable protein material such as a soy isolate, is described. An aqueous slurry of the vegetable protein material is formed and contacted with a mold of the genus Rhizopus or Aspergillus under conditions that are sufficient to reduce the level of undesirable flavor components in the protein material, yet insufficient to result in substantial replication or growth of the mold.

26 Claims, No Drawings

PROCESS FOR REDUCING THE LEVEL OF OBJECTIONABLE FLAVORS IN VEGETABLE PROTEIN BY MICROORGANISM CONTACT

BACKGROUND OF THE INVENTION

The present invention generally relates to a process for substantially reducing undesirable flavor components in vegetable protein materials, specifically vegetable protein isolates.

Protein isolates that are derived from vegetable protein sources such as the oilseeds, typically soybeans, cottonseed and the like, have contributed substantially to the economic importance of these vegetable protein materials as a crop. Soy isolate has particularly proven to be a useful and beneficial nutritional supplement in a variety of food and beverages. A protein isolate can be generally characterized as a product resulting from the extraction, subsequent concentration and purification of the proteinaceous material from a proteinaceous source such as a vegetable protein or oilseed material. Typically a protein isolate derived from a vegetable protein source such as soybeans will have a protein content on a moisture free basis that will range between about 90 and 98% by weight after isolation of the protein from the non-proteinaceous components in the vegetable protein material.

A conventional procedure for the isolation of protein from a vegetable protein material such as an oilseed meal or flakes, comprises as the first step, removing soluble lipids or oil from the vegetable protein material, either by means of a mechanical apparatus such as an expeller or by solvent extraction with an aliphatic hydrocarbon such as hexane. The material obtained from solvent extraction of the oilseed or vegetable protein source, is commonly referred to as defatted oilseed meal and is normally in the form of flakes which will contain many ingredients including complex and varying types of proteins, sugars and fiber. In a conventional isolate process, the protein and sugars are dissolved from the flakes by dispersing the flakes in an aqueous bath and adding a food grade alkaline material to raise the pH of the mixture to substantially greater than 7 in order to expedite removal of the protein. Typical alkaline materials which are used for this purpose include sodium, potassium or calcium hydroxide. The extract containing the dissolved protein and sugars is then separated from insoluble solids by centrifugation.

The pH of the clarified extract is then reduced to between about 4 and 5 in order to lower the pH of the mixture to near the isoelectric point of the protein. The protein immediately begins to precipitate from the solution as a "curd" which is separated by centrifugation or filtration of the solution containing the curd or precipitate in order to concentrate the curd for further processing.

Soy isolates in spite of their desirable nutritional properties have not always had the most desirable flavor for various types of food applications. Accordingly, a great deal of effort has been devoted towards improving the functionality or flavor of protein isolates such as soy isolates. U.S. Pat. No. 3,642,490, for example, describes a process wherein a slurry of the precipitated or isolated soy protein is subjected to dynamic heating conditions at an essentially neutral pH in order to improve the flavor and the dispersibility characteristics of the isolate.

It has also been recognized that an important factor in the development of undesirable flavors in soybeans is the oxidation of native lipids contained in the soybean material. Oxidation of lipid material can occur because of the presence of a group of enzymes identified as lipoxygenase, which typically catalyze the oxidation of lipids in the soybean thereby producing hydroperoxide compounds which can in turn undergo further transformation by enzymatic and nonenzymatic reactions to give a wide variety of compounds that adversely effect the flavor of the soybean product. Among the many components that have been identified in the volatile fraction from soy milk is the compound n-hexanal which represents about 25% of the total volatile fraction obtained from soy milk. A number of compounds besides n-hexanal have also been identified in the volatile fraction from soy milk and it is believed that many of these compounds contained in the total volatile fraction adversely effect the flavor of the soy material.

Although a number of procedures have been proposed for reducing the level of the lipoxygenase in the native soybean used as the starting material, nevertheless a means of reducing the inherent flavor in soy products without specific control of the starting material is still needed. It has long been recognized for example, that the fermentation of soy products with various molds and bacteria have been shown to decrease the "beany" off flavors contained in soy products. For centuries, a fermented soy food-stuff called "Tempeh", a traditional Indonesian food product, has been recognized as a product in which the "beany" off flavors associated with soybeans has been substantially reduced because of the fermentation process.

U.S. Pat. No. 3,917,851 for example, describes such a fermented soy protein product in which a soy protein material having a fat content not exceeding 2% by weight, is fermented in an aqueous medium with a mold of the genus Rhizopus and the fermented material is then recovered from the medium. The recovered material has an improved odor and flavor. U.S. Pat. No. 4,216,235 also describes a fermentation process in which an aqueous soy suspension is fermented with a strain of *S. cerevisiae* for purposes of reducing the flatulent sugars present in soy products.

It is therefore apparent that a number of fermentation processes have been proposed for improving the odor, flavor or digestibility of soy products. In spite of the noted procedures, fermentation processes require an extensive amount of time, usually 24 hours or longer. Furthermore, most fermentation processes substantially alter the functional or physical characteristics of the soy protein. It would therefore be desirable if a means could be found for reducing the objectionable flavors or odors contained in soy protein which involves a minimal amount of time but without substantially changing the functional or physical characteristics of the protein.

This objective has been obtained in the present invention wherein it has been determined that an aqueous soy suspension may be contacted with a mold of the genus Rhizopus or genus Aspergillus, under conditions such that substantial fermentation is avoided, yet objectionable flavor and odor components are substantially reduced.

It is therefore an object of the present invention to provide a process for the reduction of undesirable odors and flavors contained in a vegetable protein material, specifically soy protein.

It is a further object of the present invention to provide a process for the reduction of odors or flavors contained in a vegetable protein isolate, specifically soy isolate.

It is a still further object of the present invention to provide a process for the reduction of undesirable flavors and odors contained in a soy protein isolate by a process that does not substantially alter the physical or functional characteristics of the soy protein.

SUMMARY OF THE INVENTION

The present invention generally relates to a process for the reduction of undesirable flavor components contained in a vegetable protein material such as a vegetable protein isolate. The process of the present invention comprises forming an aqueous slurry of a vegetable protein material such as a vegetable protein isolate, and then controlling the pH of the slurry to about 4 to 10, preferably about 6.5 to 9.5 and most preferably at a pH of about 7.0. The slurry at the noted pH is then contacted with a mold of the genus Rhizopus such as *R. oligosporus* or *R. orzae* or alternatively with a mold of the genus Aspergillus such as *A. oryzae* or *A. niger*. Contact of the slurry with the mold is carried out under conditions that are effective to avoid substantial fermentation or replication of the mold, yet effective to reduce the level of undesirable flavor components contained in the vegetable protein material.

It is believed that the fact, that non-fermentation conditions can be employed to improve the flavor of a vegetable protein material by contact of the material with a mold is unique, as compared to the teachings of the prior art which are known to be directed solely to the prolonged fermentation of soy products with molds or bacteria for purposes of reducing undesirable flavor components. Contact of the vegetable protein slurry, with the mold of the genus Rhizopus or Aspergillus substantially reduces the total volatile fraction contained in the soy material thereby reducing undesirable flavor components contained in the soy material and inherently providing an isolate or vegetable protein product of improved flavor characteristics.

DESCRIPTION OF THE PREFERRED EMBODIMENTS

The Present invention provides a process for the reduction of undesirable flavor components contained in a vegetable protein material such as a vegetable protein isolate by contact of the vegetable protein slurry with a mold of the genus Rhizopus or Aspergillus. For purposes of understanding the specific improvement achieved in the present invention and because it is desired to explain the nature of the material to which the invention is directed in detail, the invention will be explained herein by describing the operative perimeters of the present invention with regard to soy products because this is the major area of concern to which the present process relates. The present process, however, is not intended to be so limited and as such will be generally suitable for the reduction in flavor components from a wide variety of vegetable protein materials including vegetable protein isolates derived from vegetable protein sources other than soybeans.

For purposes of providing a brief outline of the total process of the present invention, the soybeans or vegetable protein material forming the starting material of the instant invention, typically is a defatted material usually a soybean meal, flour, or flakes. More specifically, whole soybeans may be crushed or ground and then passed through a conventional oil expeller, although it is preferable to remove the oil by solvent extraction techniques such as by extraction with aliphatic hydrocarbons such as hexane. These materials have been conventionally employed for the removal of oil from oilseeds such as soybeans and the like. Following extraction of the soybeans with hexane to remove the oil the extracted beans can be flaked or ground to provide flakes or flour.

The flakes or flour is then extracted with an aqueous extractant such as water in order to solubilize the protein and form an aqueous protein extract. The formation of the aqueous protein extract can be accomplished by placing or mixing the ground soybean material in an aqueous bath to provide an aqueous extract having a pH of at least about 6 and preferably of at least about 6.5. A variety of additives can be included in the aqueous extract to assist in solubilization of the protein and typical materials include alkaline grade food reagents such as potassium, calcium or sodium hydroxide as well as other materials that might be expected to improve the efficiency or yield of the extraction procedure. It is however preferred not to include significant levels of coventionally used sulfite materials or other reducing agents in the extraction procedure, since these materials may adversely affect the activity of the mold even though contact with the mold is minimal.

Following solubilization of the protein, the aqueous extract can be treated or contacted with the mold as described below or alternatively the pH of the aqueous of the protein extract can be adjusted to the isoelectric point of the protein to form an insoluble precipitate or curd which is then contacted with the mold as described below. Nevertheless, soy protein has an isoelectric point at a pH of about 4.0 to 5.0 and the precipitation step may be carried out by the addition of a common food grade acidic reagent to provide the noted pH.

The aqueous protein extract or the precipitated protein or curd can provide the starting material for purposes of the present invention. An aqueous slurry of the proteinaceous material is formed typically having a pH of about 4 to 10, preferably about 6.5 to 9.5 and most preferably about 7.0. The slurry typically has a proteinaceous solids content of between about 3 to 30% by weight. As previously noted the aqueous extract derived from solubilization of the protein from the starting material can be employed if desired. In the event, however, the precipitated protein is employed it is dispersed in an aqueous medium to the noted level of proteinaceous solids.

The mold employed in the present invention as previously noted is preferably a mold from the genus Rhizopus; specifically a mold such as *Rhizopus oligosporus* or *Rhizopus oryzae* or alternatively is a mold from the genus Aspergillus, specifically a mold such as *A. oryzae* or *A. niger*. The mold is prepared by inoculation of sterile aqueous broth containing various nutrients which are not critical to the practice of the present invention, but nevertheless comprise materials such as proteins and nutrients needed for reproductive growth of the mold and resultant harvesting thereof to provide a source of the mold used for contact with the protein slurry pursuant to the present invention. Typically the broth will include a "Soytone" media available from Difco Inc., Detroit, Michigan, 48201, together with glucose and a yeast extract. This sterile broth can then be inoculated with spores of the desired mold followed by incubation of the inoculated broth at a temperature of about 30° C. for at least about 24 hours. This procedure typically results in the growth of the mold in the form of "pellets", which are the spherical mat of mold mycelia which are viable or active on the surface and dead in the center due to the lack of oxygen and nutrient transport in the center portion of the mold. The pelleted mold provides particles of mold having a substantially uniform diameter and typically of a size of about 1–2 mm. The mold "pellets" can be harvested from the inoculated broth by filtration or centrifugation or similar techniques and retained for contact with the aqueous protein slurry as described below.

Following harvesting of the mold or mold pellets the aqueous suspension of a protein material is contacted with the mold pellets under conditions that are effective to reduce objectionable flavors contained in the soy protein but not effective to result in a substantial degree of mold replication or reproduction. Typically these conditions mean that contact of the aqueous suspension with the mold is carried out at a temperature of about 10° to 40° C. preferably about 25° to 30° C. and that the time of contact with the mold is usually less than about one hour, usually less than about 30 minutes and most preferably about 15–30 minutes. Although the exact times and temperature of contact are not deemed to be critical features, it is apparent that a relationship exists between these two factors and the two factors may be separately adjusted to arrive at the present invention beyond the limits noted above. It is, however, important to note that in the present invention the conditions of contact with the mold is such that substantial replication or reproduction of the mold is avoided.

Although it is not critical to the practice of the present invention, it is desirable to provide some degree of agitation or to slightly aerate the suspension of protein when in contact with the mold for further improvement in the degree of flavor improvement. The amount of mold used for contact with the aqueous suspension also represents another factor, besides time and temperature, for purposes of reducing objectionable flavors contained in the soy protein, yet avoiding substantial replication or reproduction of the mold. Preferred amounts of the mold for contact with the aqueous suspension of protein is about 1 to 10 g of mold per 100 g of protein on a dry weight basis in the aqueous protein slurry.

It is apparent that while a batch type of process has been described above, a continuous process can be easily performed by employing the mold in matrix form for continuous contact with a stream of the aqueous protein slurry. The mold "pellets" could easily be embedded in or maintained on a support bed or matrix so that a continuous stream of protein slurry can be contacted with the mold under conditions sufficient to provide flavor improvement without significant growth or replication of the mold and it is intended to include a continuous means of processing within the scope of the present invention.

Following contact of the mold with the aqueous suspension of protein, the mold is removed by filtration and the aqueous extract of proteinaceous material is then adjusted to the isoelectric point of the protein which, in the case of soy isolate is a pH of about 4.0 to 5.0. Adjustment of the pH is carried out by the addition of a food grade acidic reagent and precipitates the protein from the aqueous extract. Following precipitation, the protein material may be dewatered or dried such by conventional drying techniques including freeze drying, spray drying and the like and the precipitated protein at this point can even be further processed such as being dynamically heated as described in U.S. Pat. No. 3,642,490 herein incorporated by reference for purposes of improving the dispersibility or functional characteristics of the protein.

Although the present invention is not intended to be limited by the particular dewatering technique employed, it is preferred to employ flash drying, because of the uniform fine powdered product normally obtained by techniques of this type. Flash drying techniques provide an economical and continuous processing technique resulting in powders of excellent dispersibility characteristics. Of all of the flash drying techniques, spray drying is preferred and in the present invention provides a preferred means of dewatering the protein precipitate.

As previously noted it has been determined that contact of the aqueous suspension of soy protein with a mold from the genus Rhizopus or Aspergillus wherein substantial replication or reproduction of the mold is avoided results in a significant reduction in objectionable flavors and odors contained in the soy protein.

Although the inventive concepts will be readily understood from the foregoing description, the following illustrative examples are given to assure a complete understanding of the present invention.

EXAMPLE 1

A quantity of *Rhizopus oligosporus* (NRRL 2710) mold was prepared by inoculation of 700 ml of a sterile aqueous containing 3% by weight of "soytone" media produced by Difco Inc., Detroit, Michigan, 48201, 0.5% by weight of glucose and 0.1% by weight of yeast extract. The sterile broth was inoculated with a sterile, cotton tipped swab containing freeze dried mold spores of *R. oligosporus* (NRRL 2710). The inoculated broth was incubated at 30° C. in a shaker incubator at 250 rpm for 24 hours. This resulted in growth in the form of "pellets," which represent a spherical mat of mold mycelia, viable on the surface, and dead in the center due to the lack of oxygen and nutrient transport. This generally provided pellets about 1–2 mm in diameter. The mold is harvested from the broth by filtration and washed twice with isotonic saline at a temperature of 4° C. A quantity of the harvested mold "pellets" could then be weighed and used for contact with the aqueous protein slurry.

EXAMPLE 2

A soy isolate was prepared by taking soy flakes and extracting the flakes for 30 seconds with water at a weight ratio of 10 parts water to 1 part of soy flakes. The pH of the extract was then adjusted to 9.5 by the addition of a saturated solution of calcium hydroxide. The extract was mixed for 10 minutes followed by removal of the spent flakes by centrifugation. A portion of the clarified extract, identified as Sample A, having a protein solids level of 3.5% by weight, and a pH of 9.5 was set aside for contact with the mold as described below. A second portion of the clarified extract was identified as Sample B and adjusted to a pH of 7.0, and then set aside for contact with the mold as described below.

The pH of the remaining amount of clarified extract was adjusted to 4.5 by the addition of hydrochloric acid, in order to precipitate the protein. The precipitated protein was then concentrated by centrifugation, and resuspended in a water adjusted to a pH of 7.0 with a 0.5 M solution of NaOH. The slurry had a proteinaceous solids level of 8% by weight. A portion of this slurry at a pH of 7.0 was identified as Sample C and set aside for contact with the mold as described below. Another portion of the slurry at a solids level of 8% by weight was adjusted to a pH of 9.5 by the addition of sodium hydroxide, and identified as Sample D.

The remainder of the protein precipitate at a pH of 4.5 was centrifuged, and water was added to adjust the slurry to a solids level of 8% by weight, followed by adjustment of the pH to 7.0 by the addition of sodium hydroxide. This portion was then identified as Sample E.

Samples A-E were then contacted with the mold pellets of *R. oligosporus* obtained from the process of Example 1 at a temperature of 30° C. for 60 minutes with agitation on a shaker at 250 rpm. The mold pellets were added to each sample, in an amount equal to 3 g mold/100 g of protein on a dry weight basis. After 1 hour, the samples were cooled to 4° C. and the mold removed by filtration. Following removal of the mold, the weight of the recovered mold was compared to the amount added, and it was determined that no mold growth took place during the contact time.

The pH of the protein slurries identified as Samples A, B, C and D was then adjusted to 4.5 by the addition of hydrochloric acid in order to precipitate the protein. The precipitated protein was centrifuged, then resuspended in water at a solids level of 8% by weight and neutralized to a pH of 7.0.

Samples A-E were then freeze dried. One sample identified as a "control" was carried throughout the identical process to that of Sample E except that it was not contacted with the mold.

The freeze dried samples A-E of soy isolate were suspended in a water at solids level of 3% by weight and tasted by a panel consisting of 3 members. Each slurry was assigned a numerical score from 0 to 5 in which 5 represents a high level of undesirable flavor components and 0 indicates no undesirable flavor. The results of tasting are set forth in Table 1.

TABLE 1

| Flavor evaluation of Samples A-E by taste panel | |
|---|---|
| | Average Flavor Scores |
| Control | 4.8 ± 0.3 |
| Sample A | 3.7 ± 0.6 |
| Sample B | 4.2 ± 0.3 |
| Sample C | 2.9 ± 0.6 |
| Sample D | 2.7 ± 0.8 |
| Sample E | 2.9 ± 1.2 |

0 - No undesirable flavor
5 - High level undesirable flavors

It is apparent from the above data that the samples which were contacted with the mold had better flavor than the control, as determined by the panel.

EXAMPLE 3

Two slurries of a soy protein isolate, generally produced as described in U.S. Pat. No. 3,642,490, was prepared having a solids level of 8% by weight. The slurries were prepared at an pH of 7.0 or 9.5 by dispersion in either a 0.1 M citrate-phosphate buffer having a pH of 7.0 or a 0.1 M glycine solution to provide a pH of 9.5. Following contact with the mold, the mold was removed by filtration from the two slurries which were contacted for either 20 or 60 minutes. Following removal of the mold, the weight of the recovered mold was compared to the amount of the mold added, and it was determined that no mold growth took place during the contact time. The two slurries at a pH of 7.0 or 9.5 were then precipitated at the isoelectric point by the addition of acid, centrifuged and the precipitated protein washed with water. The protein from both slurries was neutralized to a pH of 7.0 and resuspended in water at a solids level of 5% by weight for a taste panel evaluation. The panel consisted of 4 members and each slurry was assigned a numerical score ranging from 0 to 5 wherein a score of 0 indicates no undesirable flavor, and 5 indicates a high level of undesirable flavor. Two slurries of a soy isolate at a pH of 7.0 and 9.5, also produced by the process of U.S. Pat. No. 3,642,490 and treated in an identical manner to the test samples but without mold contact were also tasted by the panel as a control. The average scores by the 4 members of the panel are set forth in Table 2.

TABLE 2

| Flavor evaluation of isolates at different contact times and pH Average Flavor Score | | |
|---|---|---|
| | pH 7 | pH 9.5 |
| Control | 5 | 5 |
| 20 minute contact | 2 | 1-1.5 |
| 60 minute contact | 2 | 1-1.5 |

0 - No undesirable flavors
5 - A high level of undesirable flavors

It may be seen that contact with the mold significantly improved the flavor of the soy isolate as compared to the control, and the flavor was improved at both the 20 and 60 minute contact time.

EXAMPLE 4

A slurry of a soy protein isolate, generally produced as described in U.S. Pat. No. 3,642,490 was prepared having a solids level of 8% by weight. The slurry was prepared by dispersion of the soy isolate in a 0.1 M phosphate-citrate buffer having a pH of 7.0. The slurry therefore had a solids level of 8% by weight and a pH of 7.0. Quantities *Aspergillus oryzae* and *Rhizopus oryzae* mold were prepared as described in Example 1 except that spores of *A. oryzae* (NRRL 6720) and *R. oryzae* (NRRL 3613) were used to inoculate separate amounts of the broth. The inoculated broths were incubated at 30° C. in a shaker incubator at 250 rpm for 48 hours. The mold was collected as described in Example 1.

The protein slurry was then separately contacted with mold pellets of either *R. oryzae* or *A. oryzae* for a period of 1 hour at 30° C. The mold was added to the slurry in an amount equal to 6 g mold/100 g of protein on a dry basis. After 1 hour the two samples which has been contacted with either the *A. oryzae* or the *R. oryzae* were cooled to 4° C. and the mold removed by filtration. The pH of both samples was adjusted to the isoelectric point, the precipitated protein concentrated by centrifigation and washed with water. The protein was resuspended at 10% solids, and neutralized to a pH of 7.0. Both slurries were freeze dried, resuspended in water at a 3% solids level and tasted by a panel consisting of 3 members. Two control samples were also tested by the panel, which had been processed in an identical manner as the test samples, except they had not been contacted with either mold. The results are set for the below in Table 3.

TABLE 3

| Flavor evaluation different molds Average Flavor Scores | | |
| --- | --- | --- |
| | A. oryzae | R. oryzae |
| Sample | 1.5 | 2 |
| Control | 3 | 3.5 |

It is apparent the samples which were contacted with the mold had better flavor, than the control samples, as determined by the panel.

While the present invention has been described in terms of the specific embodiments set forth above, it is intended to include within the scope of the present invention all reasonable modifications or equivalents thereof.

We claim:

1. A method of reducing undesirable flavor components in a vegetable protein material comprising:
    forming an aqueous slurry of a vegetable protein material; and
    contacting said slurry with viable mycelia of a mold selected from the group consisting of the genus Rhizopus and genus Aspergillus under conditions effective to reduce the level of flavor components in the material but ineffective to result in substantial replication of the mold mycelia.

2. The method of claim 1 wherein the vegetable protein material is a soy material.

3. The method of claim 2 wherein the soy material is a soy protein isolate.

4. The method of claim 1 wherein the pH of the slurry is about 4 to 10.

5. The method of claim 4 wherein the pH of the slurry is about 6.5 to 9.5.

6. The method of claim 5 wherein the pH of the slurry is about 7.0.

7. The method of claim 1 wherein the Rhizopus mold is selected from the group consisting of *Rhizopus oligosporus* and *Rhizopus oryzae*.

8. The method of claim 1 wherein contact is carried out at a temperature of about 10° to 40° C.

9. The method of claim 8 wherein contact is carried out at a temperature of about 25° to 35° C.

10. The method of claim 1 wherein contact is carried out for a period of time which is less than about 1 hour.

11. The method of claim 7 wherein contact is carried out for a period of time which is less than about 30 minutes.

12. The method of claim 11 wherein contact is carried out for a period of time which is about 15 to 30 minutes.

13. The method of claim 1 wherein the slurry is contacted with mold in an amount of about 1.0 g to 10 g of mold per 100 g of protein on a dry weight basis.

14. The method of claim 1 wherein the slurry has a proteinaceous solids level of about 3 to 30% by weight.

15. The method of claim 1 wherein the Aspergillus mold is selected from the group consisting of *Aspergillus oryzae* and *Aspergillus niger*.

16. A method of reducing undesirable flavor components in isolated vegetable protein comprising:
    a. forming an aqueous slurry of a vegetable protein isolate;
    b. controlling the pH of the slurry to about 4 to 10; and
    c. contacting said slurry with viable mycelia of the mold of the genus Rhizopus under conditions effective to reduce the level of flavor components in the material but ineffective to result in substantial replication of the mold mycelia.

17. The method of claim 16 wherein the pH of the slurry is about 4.0 to 10.0.

18. The method of claim 16 wherein the pH of the slurry is about 6.5 to 9.5.

19. The method of claim 18 wherein the pH of the slurry is about 7.0.

20. The method of claim 16 wherein contact is carried out at a temperature of about 10° to 40° C.

21. The method of claim 20 wherein contact is carried out at a temperature of about 25° to 35° C.

22. The method of claim 16 wherein contact is carried out for a period of time which is less than about 1 hour.

23. The method of claim 22 wherein contact is carried out for a period of time which is less than about 30 minutes.

24. The method of claim 23 wherein contact is carried out for a period of time which is about 15 to 30 minutes.

25. The method of claim 16 wherein the slurry is contacted with mold in an amount of about 1.0 to 10 g of mold per 100 g of protein on a dry weight basis.

26. The method of claim 16 wherein the slurry has a proteinaceous solids level of about 3 to 30% by weight.

* * * * *